Figure 1:
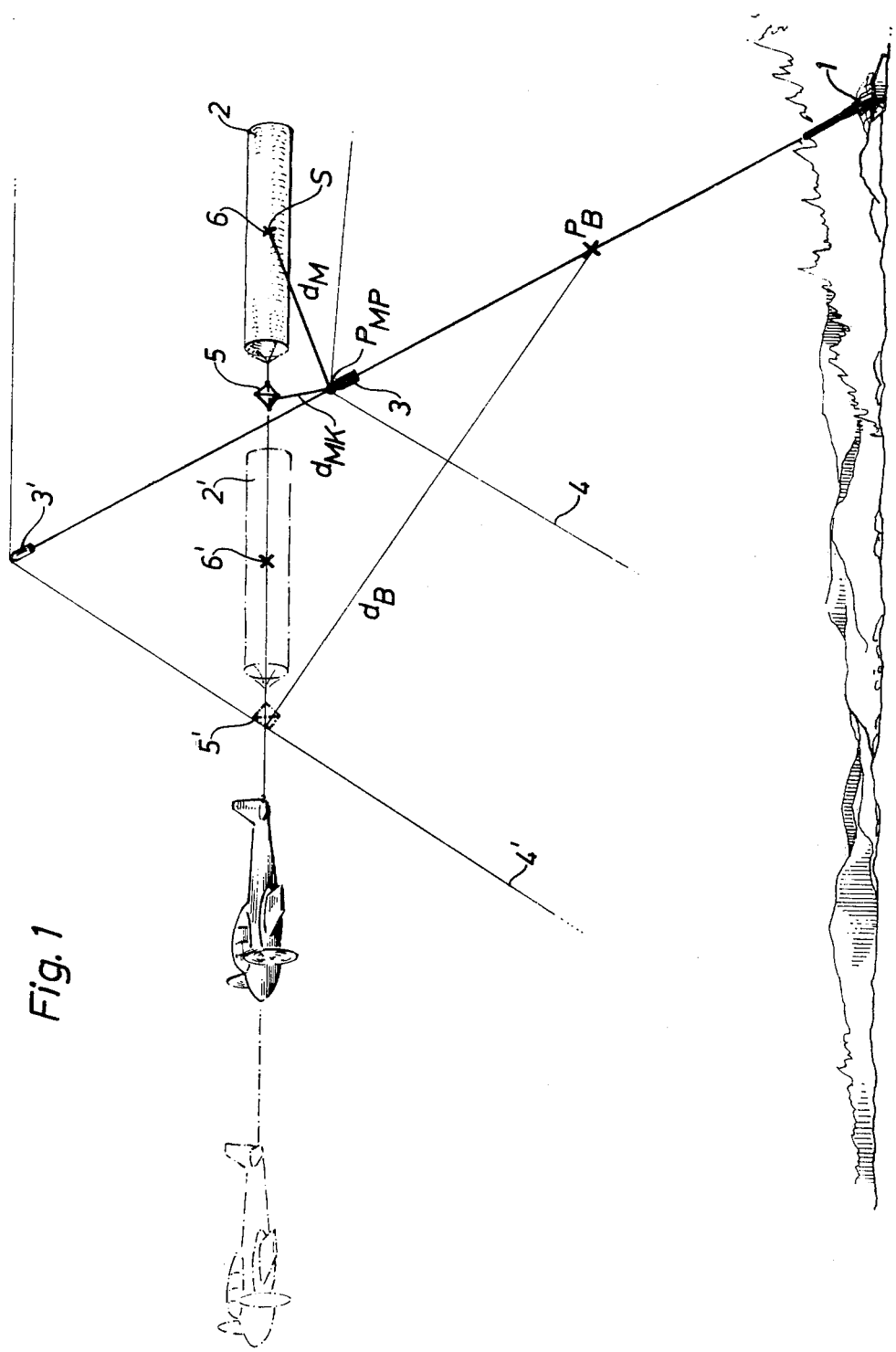

United States Patent [19]

Söderblom et al.

[11] 4,323,993
[45] Apr. 6, 1982

[54] INDICATOR APPARATUS FOR DETERMINING THE MISS DISTANCE OF A PROJECTILE IN RELATION TO A FIXED OR MOVING TARGET

[75] Inventors: Olof Söderblom, Lidingö; Lasse K. Karlsen, Solna, both of Sweden

[73] Assignee: Swedair AB, Stockholm, Sweden

[21] Appl. No.: 154,406

[22] PCT Filed: Dec. 28, 1978

[86] PCT No.: PCT/SE78/00106
§ 371 Date: Jul. 26, 1979
§ 102(e) Date: Jul. 26, 1979

[87] PCT Pub. No.: WO79/00452
PCT Pub. Date: Jul. 26, 1979

[30] Foreign Application Priority Data

Dec. 29, 1977 [SE] Sweden .............................. 7714913

[51] Int. Cl.³ .............................. G01S 5/18; F41J 5/12
[52] U.S. Cl. .................................... 367/127; 367/906; 273/372
[58] Field of Search ............... 367/117, 127, 128, 906; 273/372

[56] References Cited

U.S. PATENT DOCUMENTS

| | | | |
|---|---|---|---|
| 2,925,582 | 2/1960 | Mattei et al. | 367/128 |
| 2,932,002 | 4/1960 | Keiser | 367/60 |
| 3,205,475 | 9/1965 | Foss | 367/117 |
| 3,217,290 | 11/1965 | Sellman | 367/128 |
| 3,545,000 | 12/1970 | Heflinger | 367/127 |

FOREIGN PATENT DOCUMENTS

902756 8/1962 United Kingdom ................ 367/906

*Primary Examiner*—Richard A. Farley
*Attorney, Agent, or Firm*—Oblon, Fisher, Spivak, McClelland & Maier

[57] ABSTRACT

Indicator apparatus for determining the miss distance of a projectile in relation to a fixed or moving target, comprising pressure-sensing transducers intended to sense the pressure wave generated by the projectile in at least four points, and means for generating corresponding electrical signals therefrom. The apparatus further comprises computer circuits, calculating the distance to the point of origin of the wave, i.e. the so-called "bang generation point", in response to the characteristics of the pressure wave. This distance has been called the "miss distance" in previously known indicator apparatus, but in accordance with the invention the miss distance is defined as the shortest distance between the projectile and target, and one object of the invention is to indicate this distance and the exact position of the projectile when it is at the miss distance from the target. In the indicator apparatus in accordance with the invention, the direction of the trajectory is calculated by means of said at least four pressure transducers arranged at the corners of a polyhedron. By measuring the time differences for the passage of the pressure wave past the pressure transducers in the transducer system, the exact position of the bang generation point can be given in relation to the pressure transducer system from these time differences and the measured distance to the point. The indicator apparatus also comprises a second transducer system which can sense either the height of the first pressure transducer system above a horizontal plane, or the passage of the pressure wave at a further instant. From these data the computer circuits can give the trajectory direction which, together with the bang generation point gives the required trajectory. For shooting at fixed targets, the computer circuits give a second point on the trajectory which, together with the bang generation point, gives the trajectory per se.

6 Claims, 11 Drawing Figures

INDICATOR APPARATUS FOR DETERMINING THE MISS DISTANCE OF A PROJECTILE IN RELATION TO A FIXED OR MOVING TARGET

The present invention relates to an indicator apparatus for determining a distance of a supersonic projectile in relation to a target, including:

pressure sensing transducers for sensing the conical pressure wave generated by the supersonic projectile in at least four points, the at least four pressure transducers forming part of a first pressure transducer system;

means for measuring the time instants when the conical pressure wave is detected in the transducers and for determining the time differences between the passages of the conical pressure wave past the transducers in the first pressure transducer system;

means for measuring the time instants when the conical pressure wave is detected in the transducers and for determining the time differences between the passages of the conical pressure wave past the transducers in the first pressure transducer system; and means for detecting the pressure wave characteristics and generating electrical signals therefrom, said signals being supplied to computing means for calculating the distance from one pressure transducer to the point from which the conical pressure wave originated, the so-called "bang generation point".

When a projectile passes through the atmosphere at supersonic speed, a backward pressure wave is generated from the tip of the projectile. The wave has the form of a conical surface with a vertex angle depending on the speed of the projectile in relation to the speed of sound.

In miss distance calculators known up to now, the distance between the bang generation point and the point contacted by the pressure wave is calculated. This distance is however not equal to the miss distance, i.e. the shortest distance between projectile and target, since the target has moved during the time the pressure wave, i.e. the conical surface, has been propagated from the bang generation point to the target or a sensing point equivalent thereto.

A known miss distance calculator is taught by the British Pat. No. 902,756, and it comprises two pairs of microphones placed in such a way that the approximate distance to the bang generation point can be determined with the aid of one pair, and the space quadrant of the target in which the pressure wave is generated by the other pair. With this system it is thus only possible to determine an approximate distance to the bang generation point and to give a source area for the pressure wave. Since the point source of the pressure wave is not exactly known, the movement of the target during the time the pressure wave is propagated from the bang generation point to one of the microphones cannot be taken into consideration. Furthermore, not knowing where the projectile passes through the appropriate space quadrant is extremely unsatisfactory from the point of view of miss distance calculation.

Both the U.S. Pat. Nos. 3,217,290 and 2,925,582 relate to miss distance calculators, the latter of which is based on essentially the same principle of determining the position of the bang generation point as the device according to the British patent, while the former utilizes the pressure wave attenuation from the bang generation point to the receiver for calculating the distance, since attenuation is different for different frequencies in the pressure wave frequency spectrum. However, U.S. Pat. No. 2,925,582 discloses a very accurate method of calculating the distance to the bang generation point, and this method is applied in the apparatus in accordance with the present invention.

The object of the present invention is to enable calculation of the distance between the projectile and target, when the latter is fixed or moving, simultaneously as information is supplied as to the position of the projectile and target at every instant, and thus the position of the projectile in relation to the target when the projectile is at its shortest distance to the target.

The indicator apparatus in accordance with the invention is intended for use in all conceivable cases of firing at targets, i.e. firing from fixed ground weapons towards moving aerial targets, from airborn movable weapons to moving targets, from airborn movable weapons to fixed ground targets and finally from fixed surface weapons to fixed surface targets.

In accordance with the invention these objects are realized by substantially at least four pressure transducers being arranged at the corners of a polyhedron, having as many corners as the number of transducers and being given fixed positions in a coordinate system with a known position relative to the target. Moreover, means are provided for computing the direction of the speed vector of the conical pressure wave relative to the coordinate system from the determined time differences and thus the position of the time generation point from the calculated distance to the bang generation point, thereby obtaining a first point on the projectile trajectory. The indicator apparatus also includes a second transducer system adapted either to sense the firing time instant and measure the time from firing until the pressure wave is detected by one pressure transducer in the first transducer system, or to sense a further point on the conical pressure wave at a further time instant. These quantities are utilized to compute the projectile speed and hence the apex angle of the conical pressure wave and thus the unit vector from the bang generation point to the firing point. This unit vector defines the direction of the projectile trajectory which together with the position of the bang generation point gives the trajectory per se. Moreover, means are provided for computing the size and direction of the vector between the coordinate system and the projectile at an arbitrary time instant and determining this vector when it has a certain size, for instance its minimum size which corresponds to the miss distance between the projectile and the target. In a further embodiment of the invention the second transducer system is adapted for detecting the passage of the conical pressure wave at a further time instant when the second transducer system has a known position relative to the target and to the first transducer system. In this further embodiment means are provided for calculating the distance from the second transducer system to a bang generation point in order to determine the position of the second bang generation point. Moreover, means are provided for computing the direction of the projectile trajectory between the two bang generation points and for determining the distance between the projectile trajectory and the target in an arbitrary target plane being intersected by the projectile trajectory.

In order to execute an accurate calculation of the miss distance, it is required that the distance from a pressure transducer to the bang generation point can be calculated exactly. According to U.S. Pat. No. 3,217,290, this distance can be calculated by determining when the maximum amplitude of the pressure wave passes the transducer. This method is uncertain however, inter alia because of heavy background noise being superimposed on the pressure wave, making it difficult to determine with analogue measurements when the maximum pressure wave amplitude passes the receiver. In accordance with the invention the method described in the U.S. Pat. No. 2,925,582 is utilized, according to which any projectile moving at supersonic speed generates a ballistic pressure wave in which the air pressure increases rapidly from a static pressure $P_0$ to an excess pressure $P_0+P_1$, to attenuate linearly in both time and space to a subpressure $P_0-P_2$, subsequently to return just as quickly to the static pressure $P_0$. The amplitude on the leading edge and trailing edge of the wave, and the time distance between these edges depends on the projectile characteristics, such as caliber and speed, and on the perpendicular distance from the bang generation point to the point where the pressure wave is sensed. The apparatus in accordance with the present invention also utilizes the distance in time between the leading edge and trailing edge of the wave to determine the distance to the bang generation point. The content of the above-mentioned patent thus constitutes documentation of the known technique utilized in the apparatus according to the invention for measuring the distance to the bang generation point.

Figure 2:
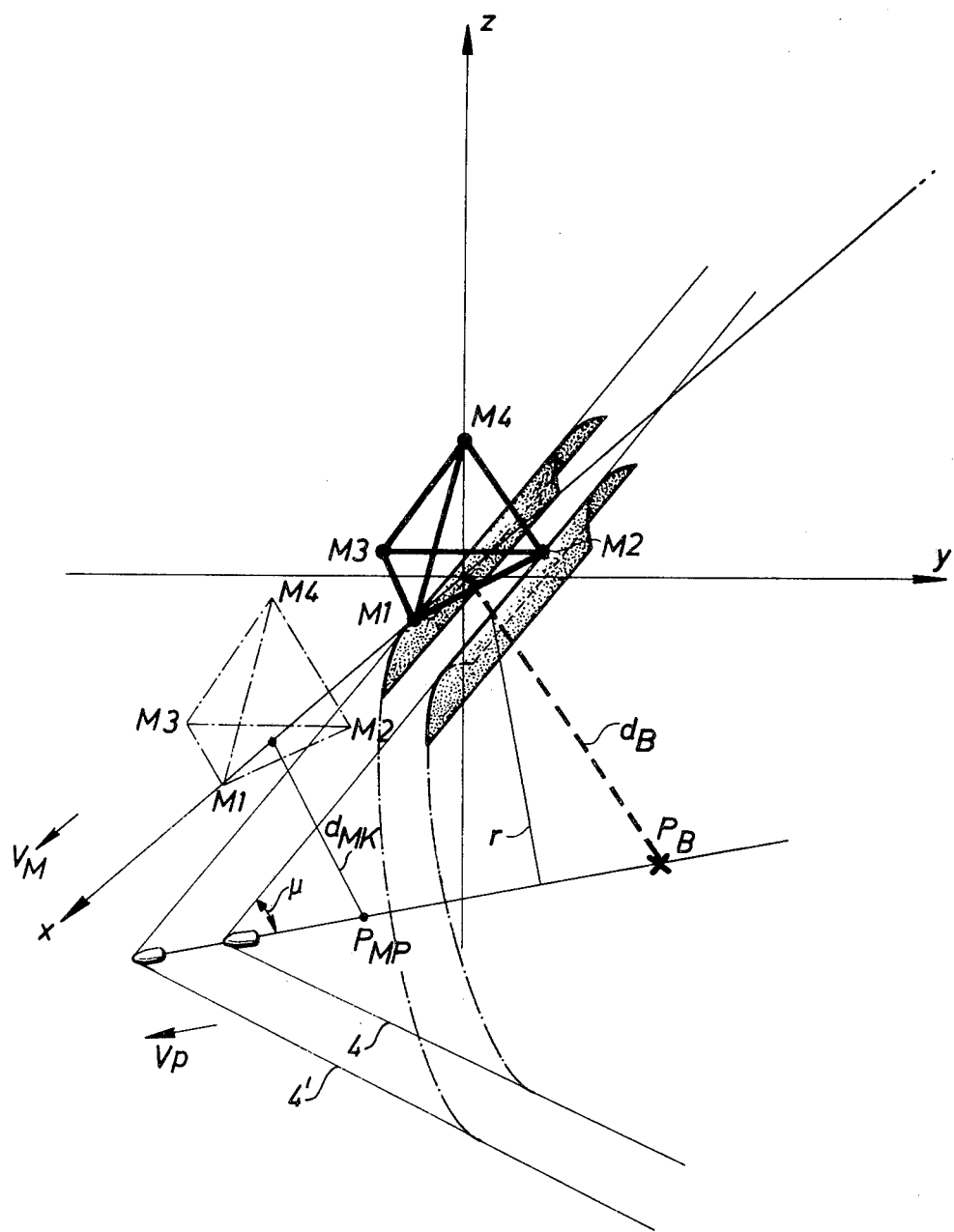
Figure 3:
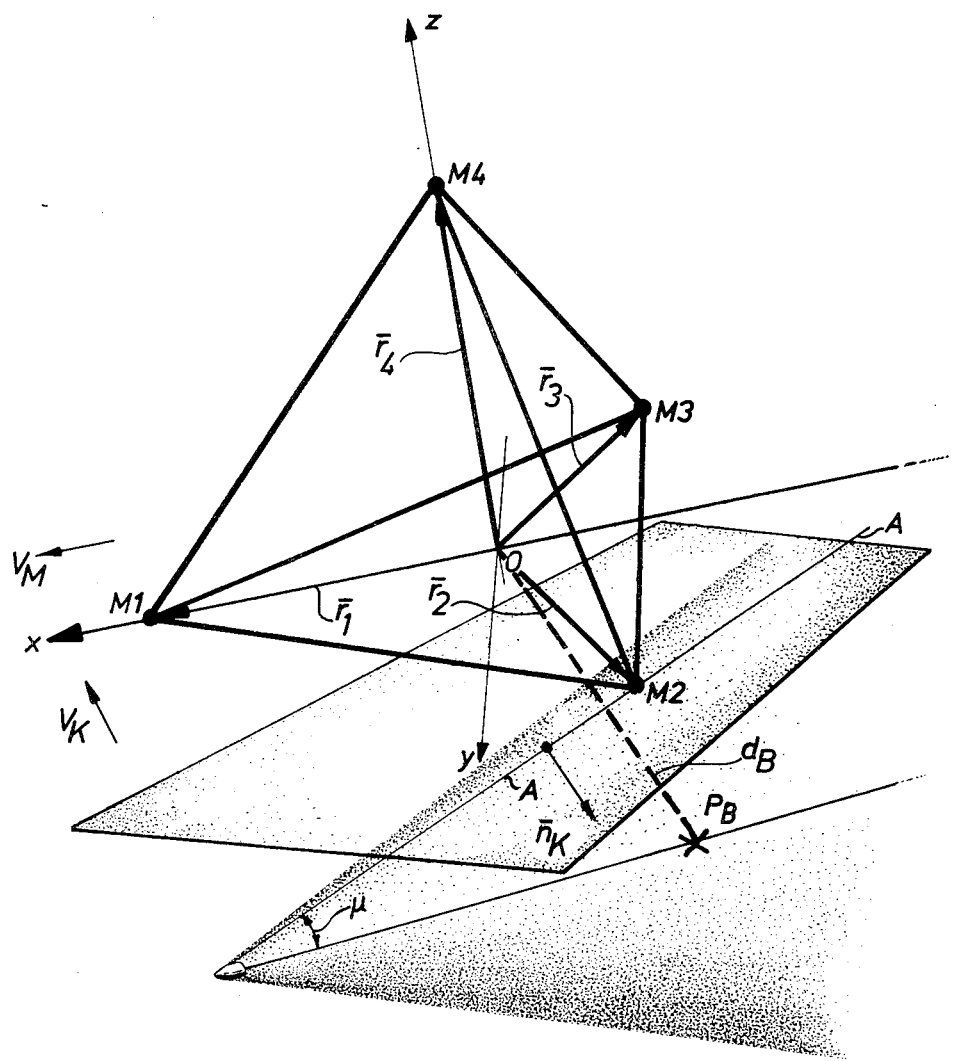
Figure 4:
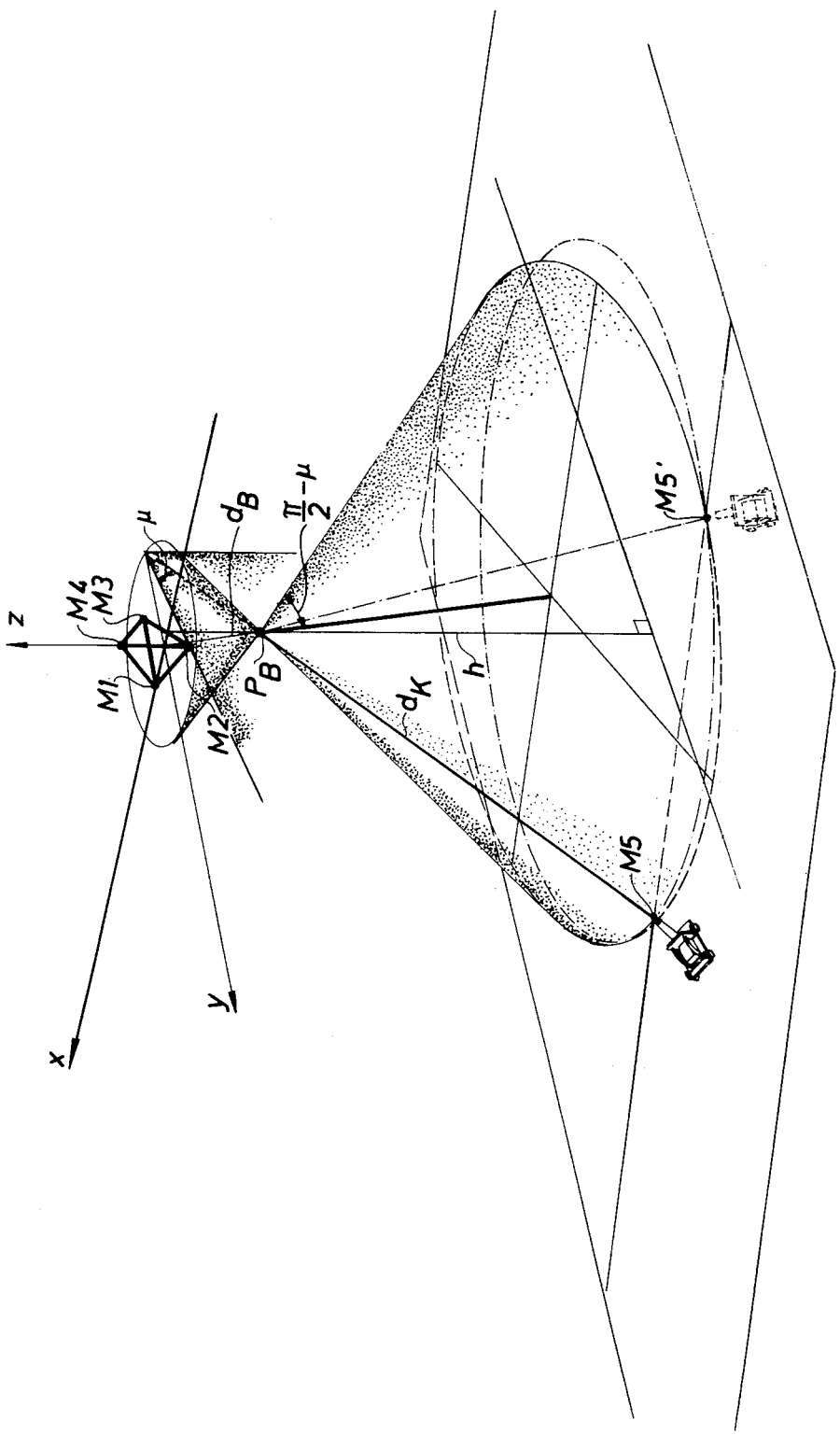
Figure 5:
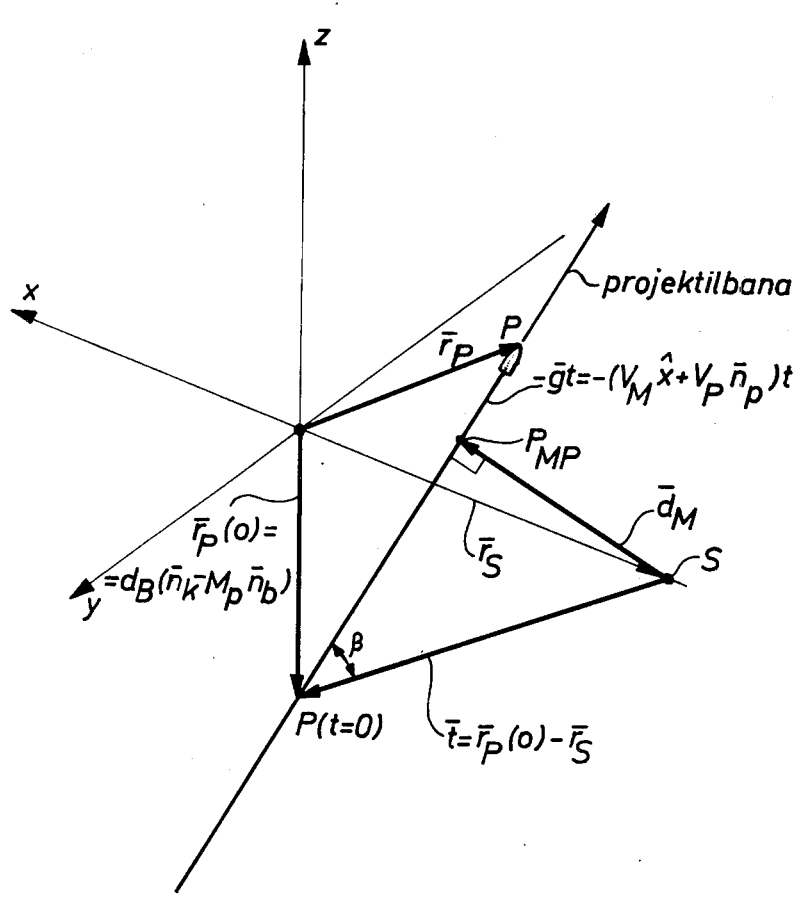
Figure 6:
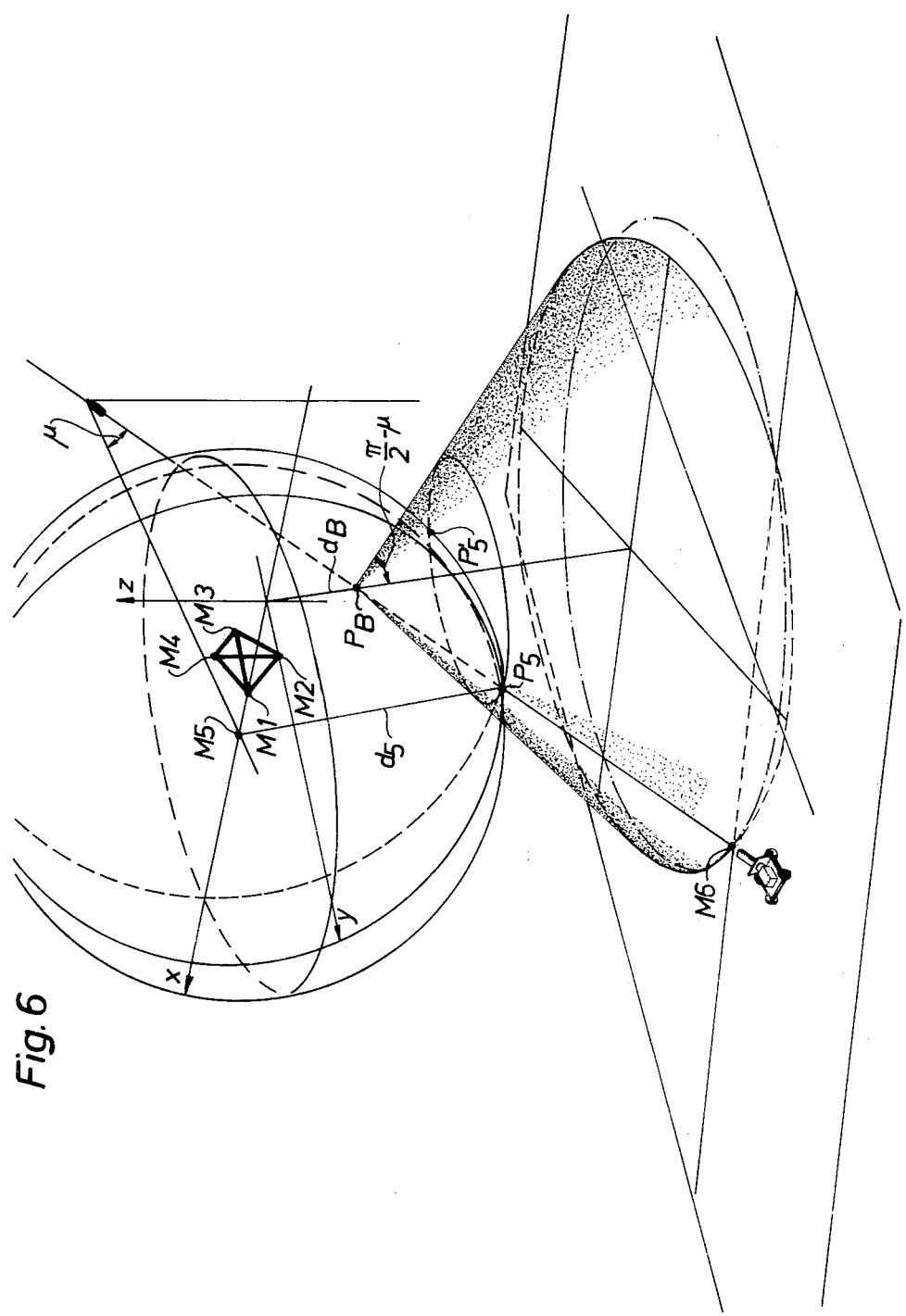
Figure 7:
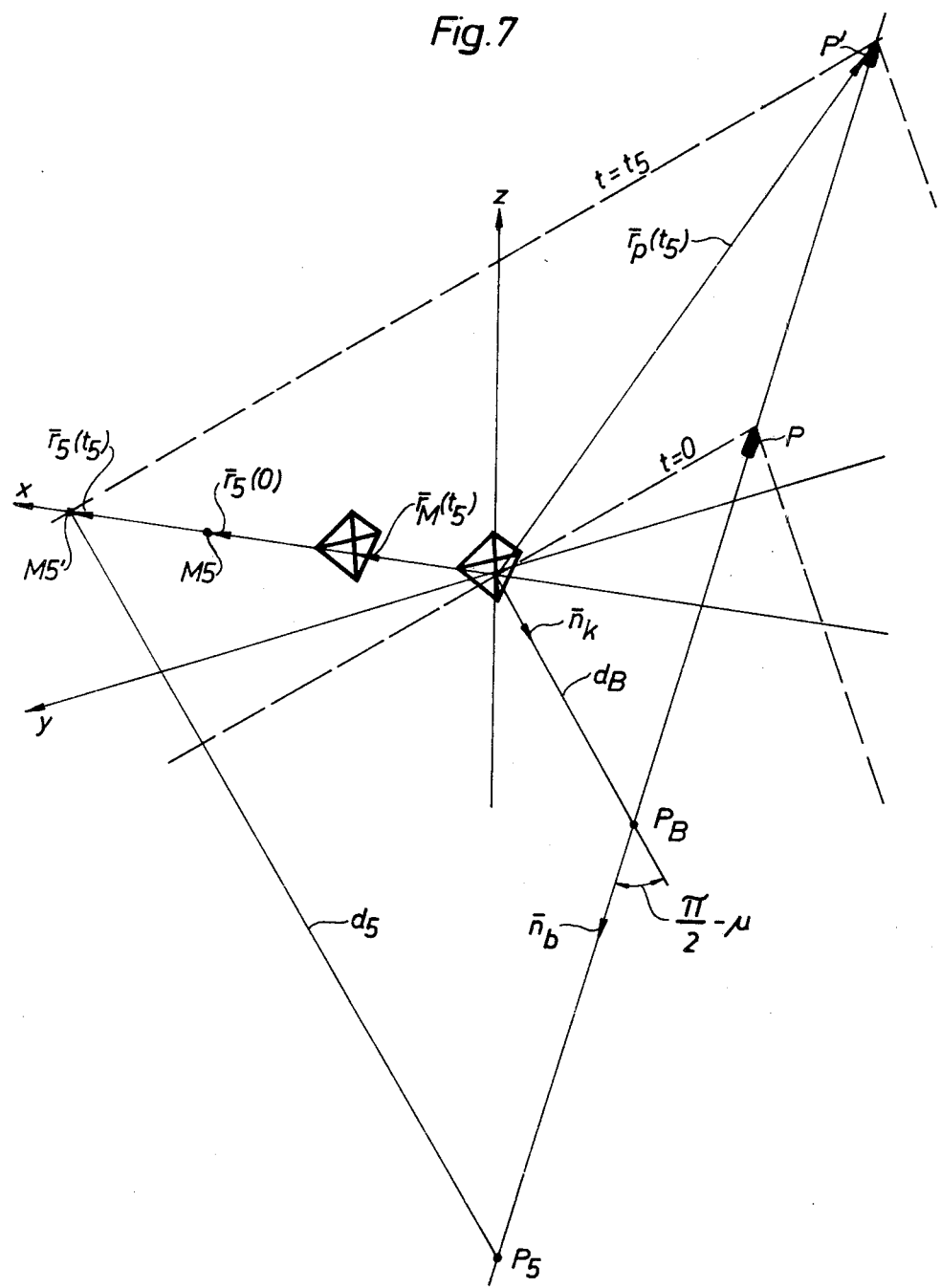
Figure 8:
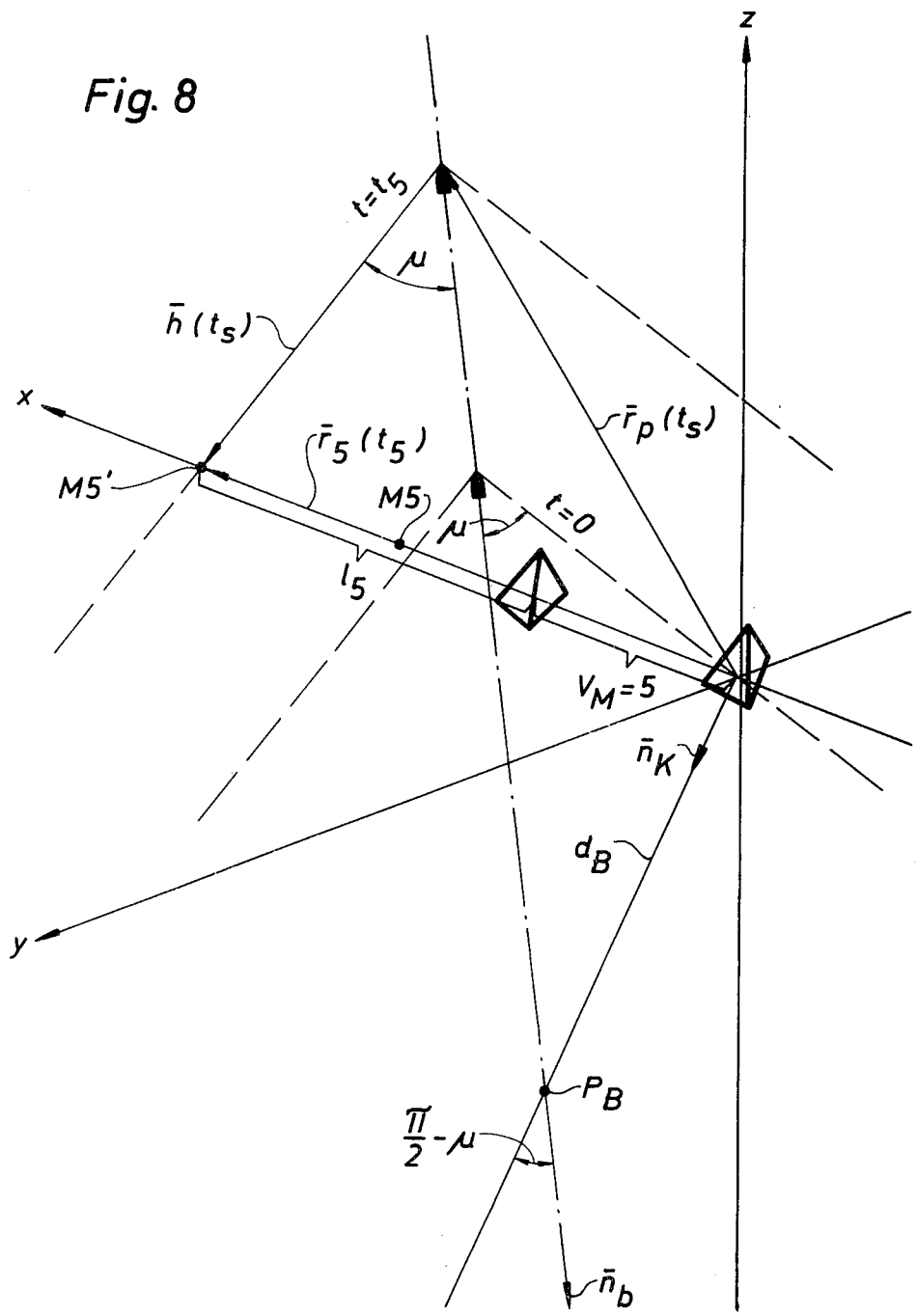
Figure 9:
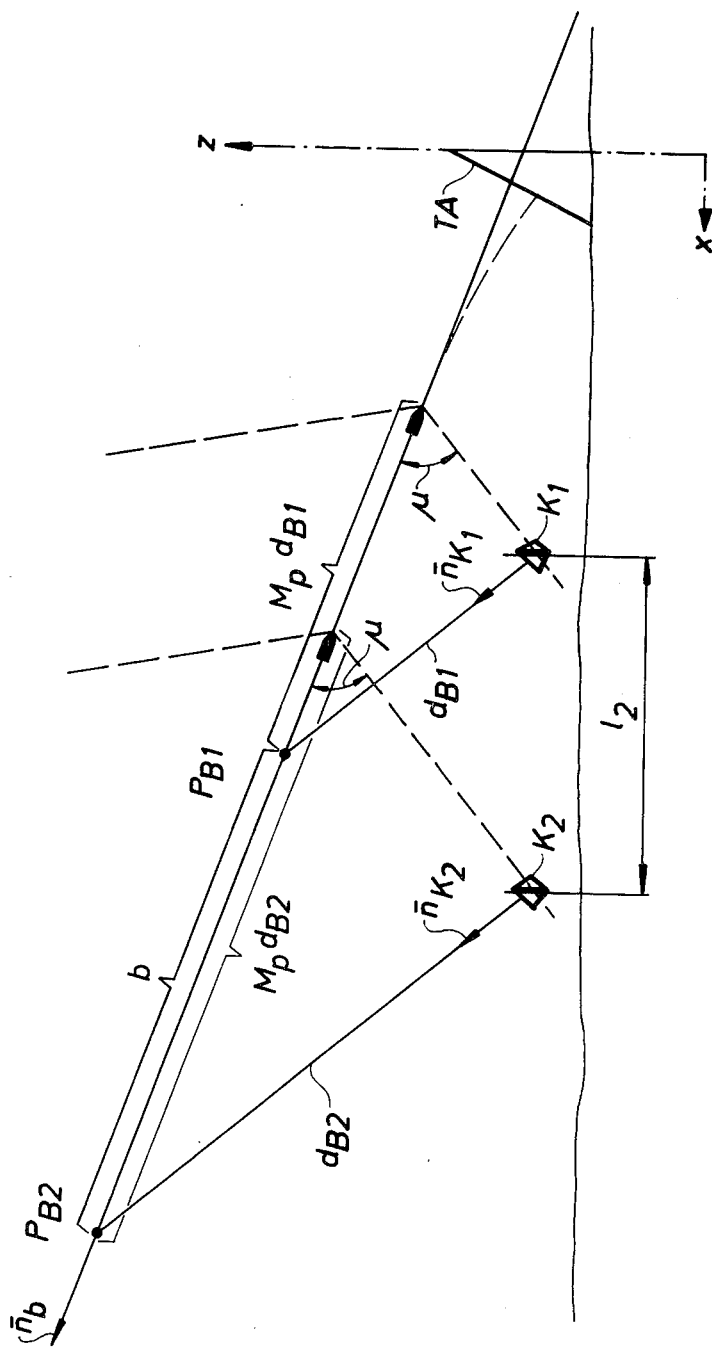
Figure 10:
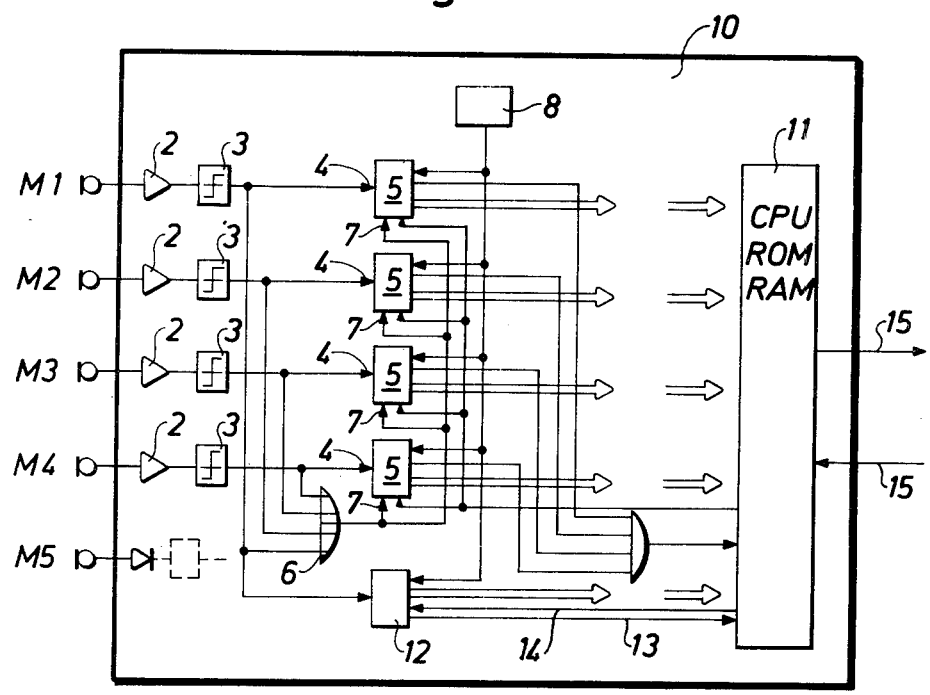
Figure 11:
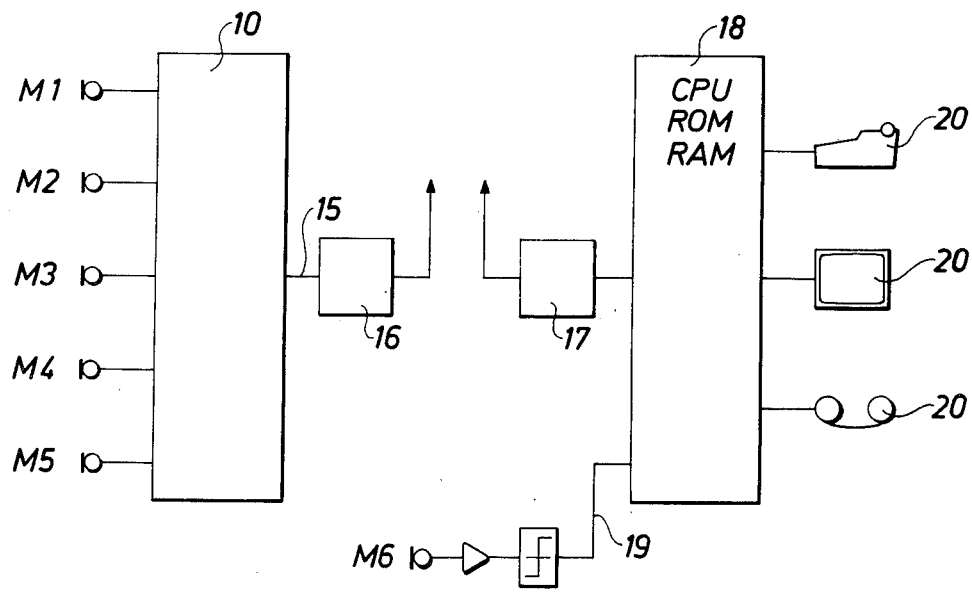

Some embodiments, selected as examples, of apparatus in accordance with the invention are described in detail below while referring to the accompanying drawings in which FIG. 1 shows firing from the ground to a target towed by an aeroplane, comprising an indicator apparatus with four pressure transducers according to the invention, FIG. 2 shows an indicator apparatus according to FIG. 1, and the passage of the pressure wave past the transducers, FIG. 3 shows a vector diagram of the quantities measured by the transducers in FIG. 2, FIG. 4 shows both conceivable projectile trajactories obtained in one embodiment of the indicator apparatus in accordance with the invention, FIG. 5 shows the vector diagram and the quantities measured in the embodiment according to FIG. 4, FIG. 6 shows an alternative embodiment of the indicator apparatus with a further pressure transducer at some distance from the four transducers, FIG. 7 shows the vector diagram for measuring the projectile trajectory in the embodiment according to FIG. 6, FIG. 8 shows a vector diagram for an alternative measurement of the projectile trajectory, FIG. 9 shows a vector diagram for firing from the air towards a fixed ground target, utilizing two pressure-sensing transducer arrays in accordance with the invention, FIG. 10 shows a circuit diagram for a microprocessor in a transducer array in accordance with the invention, FIG. 11 shows a block diagram of an indicator apparatus according to FIG. 6 with the circuit elements associated with the pressure transducers.

FIG. 1 illustrates very clearly the conditions prevailing when firing towards targets towed by aeroplanes, moving at such high speed that the speed is not negligible in relation to the speed of sound and that of the projectile. When a projectile is fired by a weapon towards a sleeve target 2, the weapon is aimed to hit a point on the target, in this case the centre 6 of the target 2. This point of aim or sight has been calculated with reference to the distance and speed of the target in relation to the firing point. At the firing instant, the target is in a position not shown on the Figure. In the position shown in full lines on the Figure, the projectile 3 is nearest to the target 2, and at a distance from it denoted by dM, which is the miss distance. In front of the target 2 there is a pressure wave-sensing transducer means 5, at a specific distance from the centre 6 of the target 2. When the projectile is at the point $P_{MP}$ at the least distance from the target it is at the distance $d_{MK}$ from the transducers.

When a projectile 3 passes through the atmosphere at supersonic speed, a pressure wave 4 is generated, indicated on the figure by lines going backwards from the tip of the projectile. This pressure wave has the form of a cone with the projectile at its vertex, and moves at the speed of sound, the wave front forming a conical surface where the cone angle is decided by the speed of the projectile in relation to the speed of sound. At every point on its trajectory the projectile will thus generate a pressure wave moving at the speed of sound in a direction at right angles to the wave front. In the case shown in FIG. 1, the target 2 is in a position outside the paper when the projectile was at position $P_B$, from which a wave front 4' has been propagated in a direction parallel to the line $d_B$. When the projectile first arrives at a position 3' on the figure the wave front 4' has arrived at the pressure transducers 5' in front of the target, which is then in position 2'. The pressure wave generated at point $P_B$ will meet the transducer array in position 5'.

If, as has been the practice up to now, it is considered satisfactory to calculate the distance $d_B$ between the bang generation point $P_B$ and the transducer array in position 5', it is quite clear that this distance is in no way a measurement of the miss distance $d_M$, i.e. the shortest distance between projectile and target neither if the target is moving nor if it is fixed. The problems the present invention intend to solve are thus to enable calculation of the miss distance $d_M$ and also position $P_{MP}$ of the projectile 3 when it is nearest to the target 2.

In order to calculate the miss distance $d_M$ the following quantities must be taken into account:

1. The distance $d_B$ between the bang generation point $P_B$ and the position 5', of the pressure transducer array (hereinafter termed "array") during the passage of the pressure wave 4'.

2. The pressure wave propagation direction from the bang generation point to the array, i.e. the vertex angle of the conical pressure wave.

3. The direction of the trajectory in relation to the path of the target.

4. The projectile speed.

5. The target speed, if the target is moving.

6. The prevailing speed of sound.

7. The distance from the array to the point on which sights are set.

The distance $d_B$ between the bang generation point $P_B$ and the transducer array when the pressure wave 4 passes it can be calculated, starting from the time between the front and trailing edges of the pressure wave, in accordance with U.S. Pat. No. 2,925,582. The direction from the array to the target, and the direction of the trajectory in relation to a conceived coordinate system with its central point in the array can be calculated starting from the direction of the pressure wave in relation to the array. This distance can in turn be calculated starting from the time interval for the conical surface to pass the transducers in the array.

FIG. 2 shows in detail how the conical pressure wave 4 meets two transducers $M_2$ and $M_1$, in that order, the portion of the conical surface meeting all the transducers in the array having been drawn with perspective curves in the Figure. The transducers $M_1$-$M_4$ are arranged at the corners of a tetrahedron having congruent sides and moving along the x axis at a speed of $V_M$, the transducers $M_1$, $M_2$ and $M_3$ being in the x-y plane. In the array there is a coordinate system with its centre at the point where the perpendicular from the vertex $M_4$ meets the side surface $M_1$-$M_2$-$M_3$.

The coordinate system also moves at a speed of $V_M$ along the x axis. In FIG. 2 there is also plotted the point $P_{MP}$, at which the projectile 3 is when the distance between the target 2 and projectile is at a minimum and which is thus the miss distance $d_M$.

According to the invention, the direction to the bang generation point $P_B$ can be calculated with knowledge of the times for the passage of the conical surface past each of the transducers $M_1$-$M_4$. The curvilinear surface must thereby be approximated to a flat surface as illustrated in FIG. 3. In this figure, the transducer $M_2$ is met by the conical surface first, and by the generatrix A—A which is thus common for the curvilinear conical surface and the approximated flat surface, as shown in FIG. 3. The vectors extending from the coordinate system origin to the corner points on the tetrahedron, at which the transducers are arranged are also shown on the figure. According to the premises, the transducers $M_1$, $M_2$ and $M_3$ are in the x-y plane and the tetrahedron moves at the speed $V_M$ along the x axis. The conical surface approximated to a flat surface moves at a speed of $V_K$ in the standardized vector direction $-\bar{n}_k$ which is counter to the direction to the bang generation point $P_B$.

Since the array and the wave plane move at a certain speed in relation to each other, the total speed between the plane and array will contain a speed vector in a direction $\bar{n}_k$ perpendicular to the plane. When the array moves, the perpendicular direction of the plane is not affected, while the speed of the plane in relation to the array, due to the movement of the latter, is given by the expression: $-V_M\hat{x}\cdot\bar{n}_k$. The speed of the plane relative to the array will thus be: $-V_K\cdot\bar{n}_k$.

For the case where the transducer $M_2$ is in the plane, as shown in FIG. 2, general expressions can be set up for the perpendicular distance from the plane to the remaining transducers $M_1$, $M_3$ and $M_4$, these distance being positive as seen in the direction of movement $\bar{n}_k$ of the plane. The following is applicable to these distances:

$$l_i = (\bar{r}_2 - \bar{r}_i)\cdot\bar{n}_k, \text{ where } i=1, 3, 4.$$

If it is assumed that the pressure wave plane meets the transducer $M_2$ at the time $t=0$, the time taken for the plane to meet the other transducers will be:

$$t_i = l_i/V_K = (\bar{r}_2 - \bar{r}_i)\cdot(\bar{n}_k/V_K), \text{ where } i=1, 3, 4.$$

The following equation system can now be set up:

$$(\bar{r}_2 - \bar{r}_1)(\bar{n}_k/V_K) = t_1 (t_2 = 0)$$

$$(\bar{r}_2 - \bar{r}_3)(\bar{n}_k/V_K) = t_3$$

$$(\bar{r}_2 - \bar{r}_4)(\bar{n}_k/V_K) = t_4$$

If it is assumed that the side of the tetrahedron is two length units, the vectors $(\bar{r}_2 - \bar{r}_i)$ can be written as follows:

$$\bar{r}_2 - \bar{r}_1 = \left(-\sqrt{3}, 1, 0\right)$$

$$\bar{r}_2 - \bar{r}_3 = (0, 2, 0)$$

$$\bar{r}_2 - \bar{r}_4 = \left(-\frac{\sqrt{3}}{3}, 1, -\frac{2}{3}\sqrt{6}\right)$$

If these expressions are introduced into the above equation system the following equation system is obtained in matrix form:

$$\begin{pmatrix} -\sqrt{3} & 1 & 0 \\ 0 & 2 & 0 \\ -\frac{\sqrt{3}}{3} & 1 & -\frac{2}{3}\sqrt{6} \end{pmatrix} \begin{Bmatrix} n_x' \\ n_y' \\ n_z' \end{Bmatrix} = \begin{Bmatrix} t_1 \\ t_3 \\ t_4 \end{Bmatrix}$$

which becomes: $\bar{n}' = (n_x', n_y', n_z') = (1/t_1)(1/V_K)\cdot(\frac{1}{2} \text{ tetrahedron side})\cdot\bar{n}_K = $ constant $\bar{n}_K$.

$V_K$ and the size of the tetrahedron are thus insignificant.

$$n_y' = \tfrac{1}{2} t_3$$

$$n_x' = \frac{1}{2\sqrt{3}} t_3 - \frac{1}{\sqrt{3}} t_1$$

$$\tfrac{2}{3}\sqrt{6}\, n_z' = -\tfrac{1}{6} t_3 + \tfrac{1}{3} t_1 + \tfrac{1}{2} t_3 - t_4$$

$$n_z' = \frac{1}{2\sqrt{6}} t_3 - \frac{3}{2\sqrt{6}} t_4 + \frac{1}{2\sqrt{6}} t_1$$

or:

$$n_x' = \sqrt{2}\, t_3 - 2\sqrt{2}\, t_1$$

$$n_y' = \sqrt{6}\, t_3$$

$$n_z' = t_3 - 3 t_4 + t_1$$

If the array is rolled an angle $\phi$ the following expressions are obtained with respect to the flight direction:

$$n_x = n_x'$$

$$n_y = n_y'\cos\phi - n_z'\sin\phi$$

$$\bar{n} = (n_x, n_y, n_z)$$

$$\bar{n}_k = \bar{n}/|\bar{n}|$$

From the above equation, it is apparent that the direction to the bang generation point $P_B$ can unambiguously be expressed by the vector $\bar{n}_k$.

The distance $d_B$ is calculated starting from the interval in time T between the leading and trailing edges of the pressure wave. The premise here is that the projectile has supersonic speed, i.e. it has a Mach number $M>1$. If the wavelength of the pressure wave is $\lambda$, then $\lambda \sim k \cdot f_1(M) \cdot r^{1/n}$, providing that $r>>L$, where r is defined in FIG. 2 and L is the length of the projectile. The wave length $\lambda$ can be measured by measuring the time T between the flanks on the leading and trailing edges of the pressure wave. Since the distance $d_B = r/\cos \mu$, the following expression on $d_B$ is obtained:

$$d_B = k_1 f_2(M) T^n$$

If supersonic streaming is generally prevalent in the vicinity of the projectile then we have:

$$f_2(M) = (M^2 - 1)/M^3 \text{ and } n = 4$$

For small values of $d_B$ and Mach number close to 1, special calibration must be done for the projectile, e.g., for $M<1.3$ and $d_B<20-30 \cdot L$.

After calculating the position of the bang generation point in relation to the coordinate system in the array, the direction of the projectile trajectory can be calculated in relation to the direction in which the target is towed, i.e. along the x axis. Different methods can be applied here, in FIG. 4 illustrated one method of calculating the direction of the trajectory starting from the firing point. Apart from the transducers $M_1-M_4$ in the array, there is a fifth pressure transducer $M_5$ arranged at the firing point, according to this embodiment. After calculating the position of the bang generation point $P_B$, the time $t_B$ it takes for the pressure wave to go from the bang generation point $P_B$ to the transducer (in this case $M_2$) first met by the conical surface can then be calculated. Knowing the distance $d_B$ the time $t_B$ is obtained from:

$$t_B = d_B/c,$$

where c is the speed of sound.

Furthermore, the time taken from firing the projectile until the pressure wave hits the transducer $M_2$ is measured. This time is denoted $\Delta t_5$.

The distance from the firing point to the transducer $M_5$ and to the bang generation point $P_B$ will then be:

$$d_k = V_p(\Delta t_5 - (d_b/c))$$

where $V_p$ is the projectile speed.

Half the conical angle of the pressure wave, i.e. the Mach angle will thus be $$\mu = \arc \sin(1/M_p)$$

where $M_p$ is the Mach number for the projectile.

The conceivable trajectories meeting the conditions above form the surface area of a cone, with its vertex at the bang generation point and a conical angle of $\pi/2 - \mu$.

Furthermore, the axial direction of the cone is parallel to the direction for the unit vector $\bar{n}_k$, and its base circle is determined by the distance $d_k$ from $P_B$. If it is assumed that the weapon is mounted on a horizontal ground plane, then this plane intersects the base circle of the cone at two points coinciding on the figure with the transducer points $M_5$ and $M_5'$. These two points thus give two conceivable trajectories, constituting both cone generatrices starting from the intersection points with the ground plane. These points are also symmetrical in relation to a vertical plane through the cone axis.

The unit vector $\bar{n}_b$ is directed along the path from $P_B$ towards the weapon.

$$\bar{n}_b \cdot \bar{n}_k = \cos(\pi/2 - \mu) = \sin \mu$$

$$n_{kx} n_{bx} + n_{ky} n_{by} + n_{kz} n_{bz} = \sin \mu$$

$$|\bar{n}_b| = 1 => n_{bz} = \pm(n^2_{bx} + n^2_{by})^{\frac{1}{2}}$$

The distance from $P_B$ to the x-y plane is positive if $P_B$ is under $(n_{kz} < 0)$ $$a = -d_B n_{kz}$$

If $\bar{n}_b$ is determined so that $d_k \bar{n}_b$ is the vector from the bang generation point to the firing point, then the z-component of this vector is equal to $-(h-a)$, where h is the flying altitude, i.e. $d_k \cdot n_{bz} = -(h-a)$.

$$\left. \begin{array}{l} n_{bz} = -\dfrac{h-a}{D_k} \\[6pt] n_{kx} n_{bx} + n_{ky} n_{by} = \sin\mu + n_{kz}\dfrac{(h-a)}{D_k} \\[6pt] n^2_{bx} + n^2_{by} = 1 - \left(\dfrac{h-a}{D_k}\right)^2 \end{array} \right\} => n_{bx}, n_{by}$$

This equation generally gives two real solutions, corresponding to the symmetrically situated firing points $M_5$ and $M_5'$, except for the case where the plan of the cone base is parallel to the horizontal plane, which gives an infinite number of solutions. However, if corresponding solutions are made for two consequent firings, one of the two conceivable solutions will be eliminated, and in the present case this means that the firing point $M_5'$ can be eliminated.

Starting from the calculations above, the miss distance $d_B$ can now be calculated (the miss distance being the least distance between the projectile and the target) using the vectors shown in FIG. 5.

The movement of the array along the x axis at the optional time t can be given as:

$$\bar{r}_M = V_M \cdot t \cdot \hat{x}$$

At an optional time t the position of the projectile in the coordinate system with its origin in the array will thus be:

$$\bar{r}_p(t) = d_B(\bar{n}_k - M_p \bar{n}_b) - (V_M \hat{x} + V_p \bar{n}_b)t$$

The vector between the projectile and the array at time $t=0$, i.e. when the conical surface meets the transducer $M_2$, will then be:

$$r_p(0) = d_B(\bar{n}_k - M_p \bar{n}_b)$$

The vector from the array to the aiming point S at which sights are set is $\bar{r}_s$ and it is always on the x axis. The vector $\bar{T}$ between the point S and the trajectory for the time $t=0$ will be:

$$\bar{T} = \bar{r}_p(0) - \bar{r}_s = d_B(\bar{n}_k - M_p \bar{n}_b) - \bar{r}_s$$

The scalar product between the vector $\bar{T}$ and the vector $\bar{g} = V_M \hat{x} + V_p \bar{n}_b$ then gives the angle $\beta$ according as the following:

$$\beta = \arccos(\vec{r}\cdot\vec{g})/(|\vec{r}|\cdot|\vec{g}|)$$

The vector $d_M$ from the point S to the miss point $P_{MP}$ will then be:

$$d_M = |\vec{r}|\cdot\sin\beta$$

$$\vec{d}_M = \vec{r} - |\vec{r}|\cos\beta\cdot(\vec{g}/|\vec{g}|)$$

In accordance with an alternative embodiment of the invention, the direction of the trajectory can be calculated using a further transducer M5, spaced from the array of four pressure transducers M1–M4 arranged at the corner points of a tetrahedron. The mathematical model on which this calculation is based is apparent from FIG. 6. In this figure a coordinate system fixed in relation to the ground is used, in which the array M1–M4 is at origin at the time $t=0$, i.e. when the conical surface of the pressure wave meets the transducer M2. The position of the bang generation point $P_B$ and the conical surface giving rise to this point is determined as before. The extra transducer M5 is on the x axis and at a distance $l_5$ in front of the array M1–M4. The extra transducer M5 and the array M1–M4 are moved along the x axis from the origin after the time $t=0$, and at the time $t=t_5$ the conical surface reaches the transducer M5 from a second bang generation point $P_5$ on the trajectory. The distance $d_5$ can then be calculated, but not the position of the bang generation point $P_5$, since the direction of this point is not known. However, it is known that the point must lie on a sphere having its centre at the point M5 and radius $d_5$, and since the projectile speed and the time $t=t_5$ are known, the distance $P_5-P_B$ between both bang generation points can be calculated. It is also known that the second bang generation point $P_5$ must lie on the base circle of the cone, the generatrix of which corresponds to the distance between both bang generation points.

Both geometrical figures thus obtained, i.e. the sphere with its centre in M5 and radius $d_5$, and the base circle to a cone with its vertex at $P_B$ and cone angle $=\pi/2-\mu$, and the generatrix with the length from $P_5$ to $P_B$ will intersect each other at two points, $P_5$ and $P_5'$. Both these trajectories are symmetrical with relation to a plane through the cone axis and x axis. By making a corresponding calculation for a second projectile trajectory one of both intersection points can be eliminated, and it is thus possible to determine the trajectory direction, calculation of the miss distance then taking place in the same way as that in conjunction with FIGS. 4 and 5.

The projectile speed at the time $t=0$ is obtained by placing a pressure transducer M6 at the firing point, the time difference between the firing instant and the time $t=0$ being thus obtained, and in turn used to obtain the projectile speed from firing tables. The quantities used in the mathematical treatment below are apparent from FIGS. 6 and 7, in which the following denotations are:

$M_p$ = projectile Mach number
$c$ = speed of sound
$c\cdot M_p = V_p$ = projectile speed
$M_M$ = Mach number for the target, i.e. $V_M = c\cdot M_M$
distance $P_5 - P' = d_5\cdot M_p$
distance $P_B - P = d_B\cdot M_p$
distance $P - P' = c\cdot M_p\cdot t_5$
distance $M_5 - M_5' = c\cdot M_M\cdot t_5$ The mathematical solution is as follows:
Projectile position at $t=0$:

$$\vec{r}_p = d_B\vec{n}_k - (d_BM_p + V_p\cdot t)\vec{n}_b$$

$\vec{n}_b$ = trajectory direction, positive from $P_B$ towards the weapon
Cone along the trajectory: $\vec{n}_b\cdot\vec{n}_k = \sin\mu$; $|n_b| = 1$
Position of transducer array:

$$\vec{r}_M = V_M t\,\hat{x}$$

The transducer M5 is assumed to lie on the x axis at a distance $l_5$ in front of the array. The position of M5 is then:

$$\vec{r}_5 = (l_5 + V_M\cdot t)\hat{x}$$

Bang generation point for $M_5 = P_5$
Registration time in $M_5 = t_5$
Distance $M_5 - P_5 = d_5$
The position of $M_5'$ for the time $t=t_5$, i.e. when the pressure wave passes, is:

$$\vec{r}_5(t_5) = (l_5 + V_p\cdot t_5)\hat{x}\ (=a_5\hat{x})$$

The projectile position at $t=t_5$ is:

$$\vec{r}_p(t_5) = d_B\vec{n}_k - (d_BM_p + V_p t_5)\vec{n}_b$$

The distance along the trajectory from $P_5$ to $\vec{r}_p(t_5) = d_5\cdot M_p$
The position of $P_5$ will thus be:

$$P_5 = \vec{r}_p(t_5) + d_5 M_p\vec{n}_b$$

(note that $\vec{n}_b$ is positive backwards in the trajectory)
The value of $d_5$ is obtained from the following equation:

$$d_5 = |\vec{p}_5 - \vec{r}_5(t_5)| \text{ or}$$

$$d^2_5 = (\vec{p}_5 - \vec{r}_5(t_5))\cdot(\vec{p}_5 - \vec{r}_5(t_5))$$

which gives:

$$\vec{p}_5 - \vec{r}_5(t_5) =$$

$$d_B\vec{n}_k - (d_BM_p + V_p t_5)\vec{n}_b +$$

$$d_5 M_p\vec{n}_b - (l_5 + V_M t_5)\hat{x} = d_B\vec{n}_k -$$

$$b_5 n_b - a_5\hat{x}$$

$$a_5 = l_5 + V_M t_5;$$

$$b_5 = d_BM_p + V_p t_5 - d_5 M_p$$

$$\therefore d_5^2 = (d_B\vec{n}_k - b_5\vec{n}_b - a_5 x)(d_B\vec{n}_k - b_5\vec{n}_b - a_5 x)\left\{\vec{n}_k\cdot\right.$$

$$\vec{n}_b = \sin\mu = d_B^2 - d_Bb_5\sin\mu - a_5d_Bn_{kx} - d_Bb_5\sin\mu +$$
$$\phantom{\vec{n}_b = \sin\mu =} b_5^2 + a_5b_5n_{bx} - d_Ba_5n_{kx} + a_5b_5n_{bx} + a_5^2$$

$$n_{bx} = \frac{d_5^2 - (d_B^2 + a_5^2 + b_5^2 - 2a_5d_Bd_{kx} - 2d_Bb_5\sin\mu)}{2a_5b_5}$$

$\left.\begin{array}{l}n_{by},\ n_{bz}\text{ from }|n_b| = 1\\ \vec{n}_k - \vec{n}_b = \sin\mu\end{array}\right\}$ two solutions for $\vec{n}_b$ $d_M$ and $\vec{d}_M$ are subsequently calculated in the same manner as before.

The trajectory component $n_{bx}$ can be alternatively calculated according to the following method, and with reference to FIG. 8.

The position of the array at the time $t=t_5$ is:

$$V_M t_5 \hat{x}$$

The position of $M_5'$ at the time $t=t_5$ is:

$$\bar{r}_5(t_5) = a_5\hat{x} = (l_5 + V_M t_5)\hat{x}$$

For $t=t_5$, the vector $\bar{h}(t)$ from the projectile to $M'5$ is a generatrix of the Mach cone:

$$\bar{h}(t_5)\cdot\bar{n}_b = |\bar{h}(t_5)| \cos \mu$$

where $$\bar{h}(t_5) = \bar{r}_5(t_5) - \bar{r}_p(t_5)$$

The position of the projectile is:

$$\bar{r}_p(t_5) = d_B \bar{n}_k - (d_B M_p + V_p t_5)\bar{n}_b$$

$=>$ quadratic equation for the x component of $\bar{n}_b (n_{bx})$ $$c_2 n_{bx}^2 - 2c_1 n_{bx} + c_0 = 0$$

$$c_2 = M_p^2 a_5^2$$

$$c_1 = -a_5 V_p t_5$$

$$c_0 = (M_p^2 - 1)(2d_B c t_5 + 2a_5 d_b n_{kx} - a_5^2) + V_p^2 t_5^2$$

The advantage with this method is that the calculation of the distance $d_5$ is not entirely necessary, although the method has the disadvantage that it gives two solutions for $n_{bx}$ for the above equation. Information on the distance $d_5$ should therefor be used to calculate $n_{bx}$ according to the previously described method. This value of $n_{bx}$ is then used for selecting the right $n_{bx}$ for the two solutions in the alternative method.

As will be apparent from the above mathematical treatment of the problem of determining the direction from the array to the bang generation point, it is absolutely essential to exactly determine the times at which the conical surface of the pressure wave arrives at the different pressure transducers.

In the case where the indicator apparatus in accordance with the invention is to be used for firing from airborn movable weapons towards a fixed ground target TA, the premises are applicable which are apparent from FIG. 9.

The distances $d_{B1}$ and $d_{B2}$ are calculated in the same way as previously for a certain assumed Mach number, e.g. $M=1, 5-2$. The distance b between the bang generation points is subsequently calculated with knowledge of the quantities $d_{B1}$, $d_{B2}$, $n_{k2}^n k_1$, and $1_2$.

The time $\Delta t$ for the passage of the pressure wave past both arrays $K_2$ and $K_1$ is measured, the Mach number $M_p$ for the projectile being subsequently calculated from the formula:

$$M_p = b/(\Delta t - c - d_{B1} + d_{B2})$$

where c = the speed of sound.

The values of the distances $d_{B1}$ and $d_{B2}$ are corrected with the calculated Mach number, whereafter the trajectory through the bang generation points $P_{B1}$ and $P_{B2}$ can be calculated.

As will be seen from the circuit diagram according to FIG. 10, the four microphones M1, M2, M3 and M4 are connected to a microprocessor 10, adapted for calculating the time interval $T_F$ between the leading and trailing edges of the pressure wave as it passes one of the microphones, and the time intervals for the passage of the wave past each of the subsequent three microphones. Each of the microphones is connected to an amplifier 2 and a Schmitt trigger circuit 3, generating a pulse with TTL adjusted amplitude when the signal from the microphone exceeds a predetermined limiting value. The outputs of the Schmitt trigger circuit 3 are connected to a "stop" input 4 on each of the connected counters 5 and to a common OR gate 6, the output of which is connected to a "start" input 7 on all the counters 5. The counters 5 are also connected to an oscillator 8, generating a pulse train with a predetermined repitition frequency. The passage times of a pressure wave past the microphones M1, M2, M3 and M4 are determined in the following way.

When the wave passes a microphone, e.g. the microphone M1, a pulse is generated in the Schmitt trigger circuit 3, giving a start signal via the OR gate 6 to all the counters 5. These then count the pulses generated in the oscillator 8. The counter having its "stop" input connected to the microphone M1, which is first met by the wave, is given a stop signal simultaneously as it obtains a start signal, and it thus remains zeroed. While the wave passes each of the remaining microphones M2, M3 and M4, a pulse is generated in the associated circuits 3 which stops the appropriate counter 5, which thus contains a count proportional to the time which has passed since it was started. When a counter has stopped, the level is also raised on an input to an AND gate 9. The counters 5 are furthermore arranged so as not to start for new pulses from the OR gate 6 before a resetting signal has been obtained from a microcomputer 11. When all the microphones have been passed by the pressure wave, the levels on all the inputs to the AND gate 9 are high, which means that its output is high, which in turn gives an interruption signal to the microcomputer 11 which then reads off the count in each of the counters associated with the microphones, and registers these counts for transmission to the main system computer. The microcomputer 11 subsequently resets the counters 5 and the cycle can be repeated. Where there is a fifth microphone M5, this is connected to the microcomputer 11 in the same way as the other microphones.

The time $T_F$ between the leading and trailing edges of the pressure wave is measured in a counter 12. When the leading edge meets a microphone, e.g. the microphone M1, the counter 12 is started and counts pulses from the oscillator 8 which is also connected to the counter. The count in the counter is stored as long as pulses are obtained from the Schmitt trigger circuit 3 associated with the microphone M1. If no pulse is detected within a certain predetermined time, which is dependent on the length of the projectile, the last received pulse is assumed to come from the trailing edge of the wave. An interruption signal is then given via the wire 13 to the microcomputer 11, which reads off the value in the counter 12. This value thus gives the time between the trailing and leading edges of the pressure wave. After reading it, the microcomputer 11 resets the counter 12 via the wire 14 and the cycle can be repeated.

The microcomputer 11 subsequently transmits collected data via a link 15 to the central system computer 18 where the mathematical calculations are carried out. The connection to the central computer can either be done via a radio link or by a cable, in the case where the micro processor 10 is on the ground.

FIG. 11 is a block diagram of an indicator apparatus in accordance with the invention, preferably of the kind shown in FIG. 6, where the microcomputer 10 is connected to the central computer 18 via a radio link, comprising transmitter receiver units 16, 17 for two-way communication. The ground-based microphone M6 is connected to the central computer 18 via a wire 19 for registering the firing time. The miss distances registered during firing, and the positions of the "miss points" can be registered on different readout means 20 connected to the central computer, i.e. stylus recorders, presentation screens or magnetic tapes.

The characteristic constants for each projectile type and firing occasion, which are required for calculating the position of the bang generation point and the direction of the trajectory, can be obtained from tables stored in the computor.

We claim:

1. An indicator apparatus for determining a distance of a supersonic projectile in relation to a target, comprising:
   at least four pressure sensing transducers for sensing the conical pressure wave generated by the supersonic projectile in at least four points, the at least four pressure transducers forming part of a first pressure transducer system,
   means for measuring the time instants when the conical pressure wave is detected in the at least four transducers and for determining the time differences between the passages of the conical pressure wave past the at least four transducers in the first pressure transducer system;
   means for detecting the pressure wave characteristics and generating electrical signals therefrom;
   computing means coupled to said detecting means for calculating based on said electrical signals the distance from one pressure transducer to the point from which the conical pressure wave originated, the so-called "bang generation point";
   said at least four transducers being arranged at the corners of a polyhedron, having as many corners as the number of transducers and being given fixed positions in a coordinate system with a known position relative to the target;
   means for computing the direction of the speed vector of the conical pressure wave relative to said coordinate system from the determined time differences and thus the position of the bang generation point from the calculated distance to the bang generation point, thereby obtaining a first point on the projectile trajectory;
   a second transducer system for sensing the firing time instant and including means for measuring the time from firing until the pressure wave is detected by said one pressure transducer in the first transducer system in order to determine the projectile speed and hence the apex angle of the conical pressure wave and thus the unit vector from the bang generation point to the firing point, said unit vector thereby defining the direction of the projectile trajectory, which together with the position of the bang generation point gives the trajectory per se; and
   means for computing the size and direction of the vector between said coordinate system and the projectile at an arbitrary time instant and determining this vector when it has a certain size.

2. An indicator apparatus for determining a distance of a supersonic projectile in relation to a target, comprising:
   at least four pressure sensing transducers for sensing the conical pressure wave generated by the supersonic projectile in at least four points, the at least four pressure transducers forming part of a first pressure transducer system,
   means for measuring the time instants when the conical pressure wave is detected in the at least four transducers and for determining the time differences between the passages of the conical pressure wave past the at least four transducers in the first pressure transducer system;
   means for detecting the pressure wave characteristics and generating electrical signals therefrom;
   computing means coupled to said detecting means for calculating based on said electrical signals the distance from one pressure transducer to the point from which the conical pressure wave originated, the so-called "bang generation point";
   said at least four transducers being arranged at the corners of a polyhedron, having as many corners as the number of transducers and being given fixed positions in a coordinate system with a known position relataive to the target;
   means for computing the direction of the speed vector of the conical pressure wave relative to said coordinate system from the determined time differences and thus the position of the bang generation point from the calculated distance to the bang generation point, thereby obtaining a first point on the projectile trajectory;
   a second transducer system for detecting the passage of the conical pressure wave at a further occasion;
   means for sensing the firing instant and for computing the projectile speed and hence the apex angle of the conical pressure wave and thus the unit vector from the bang generation point to the firing point, said unit vector thereby defining the direction of the projectile trajectory, which together with the position of the bang generation point gives the trajectory per se; and
   means for computing the size and direction of the vector between said coordinate system and the projectile at an arbitrary time instant and determining this vector when it has a certain size.

3. An indicator as claimed in claim 2, comprising:
   means for registering the time difference between the firing instant and the time when the pressure wave is detected by a transducer in the first transducer system in order to determine the projectile speed and hence the Mach number as well as the conical angle of the pressure wave, which quantities are converted into electrical signals and supplied to the means for calculating the size and direction of the vector between the coordinate system moving with the polyhedron and the projectile.

4. An indicator as claimed in claim 2, wherein the second transducer system comprises:
   at least one pressure transducer arranged for moving in unison with the first pressure transducer system.

5. An indicator according to claims, 1, 2, 3 or 4, wherein said vector size and direction computing means includes:
   means for determining when the vector between said coordinate system and said projectile has a minimum size corresponding to the miss distance between the projectile and the target.

6. An indicator apparatus for determining a distance of a supersonic projectile in relation to a target, comprising:
   at least four pressure sensing transducers for sensing the conical pressure wave generated by the supersonic projectile in at least four points, the at least four pressure transducers forming part of a first pressure transducer system;
   means for measuring the time instants when the conical pressure wave is detected in the at least four transducers and for determining the time differences between the passages of the conical pressure wave past the at least four transducers in the first pressure transducer system;
   means for detecting the pressure wave characteristics and generating electrical signals therefrom;
   computing means coupled to said detecting means for calculating based on said electrical signals the distance from one pressure transducer to the point from which the conical pressure wave originated, the so-called "bang generation point";
   said at least four transducers being arranged at the corners of a polyhedron, having as many corners as the number of transducers and being given fixed positions in a coordinate system with a known position relative to the target;
   means for computing the direction of the speed vector of the conical pressure wave relative to the target;
   means for computing the direction of the speed vector of the conical pressure wave relative to said coordinate system from the determined time differences and thus the position of the bang generation point from the calculated distance to the bang generation point, thereby obtaining a first point on the projectile trajectory;
   a second transducer system for detecting the passage of the conical pressure wave at a further occasion, said second transducer system having a known position relative to the target and to the first transducer system;
   means for detecting the pressure wave characteristics and for calculating the distance from said second transducer system to a second bang generation point in order to determing the position of the second bag generation point; and
   means for computing the direction of the projectile trajectory between said two bang generation points and for determining the distance between the projectile trajectory and the target in an arbitrary target plane being intersected by the projectile trajectory.

* * * * *